A. L. MOWRY.
MACHINE FOR MANUFACTURING GROOVED PINS, &c.
APPLICATION FILED OCT. 12, 1907.

939,061.

Patented Nov. 2, 1909.
9 SHEETS—SHEET 2.

Witnesses:

Albert L. Mowry,
Inventor,

By
Attorney

A. L. MOWRY.
MACHINE FOR MANUFACTURING GROOVED PINS, &c.
APPLICATION FILED OCT. 12, 1907.

939,061.

Patented Nov. 2, 1909.
9 SHEETS—SHEET 7.

WITNESSES.

INVENTOR
A. L. Mowry
BY
ATT'Y

A. L. MOWRY.
MACHINE FOR MANUFACTURING GROOVED PINS, &c.
APPLICATION FILED OCT. 12, 1907.

939,061.

Patented Nov. 2, 1909.

WITNESSES.
J. H. Glenn
Wm. A. Wyman

FIG. 43.

INVENTOR
A. L. MOWRY.
BY
ATT'Y.

UNITED STATES PATENT OFFICE.

ALBERT LAWRENCE MOWRY, OF ST. JOHN, NEW BRUNSWICK, CANADA, ASSIGNOR TO HARRY RICHARDS McLELLAN, OF ST. JOHN, CANADA.

MACHINE FOR MANUFACTURING GROOVED PINS, &c.

939,061.

Specification of Letters Patent. Patented Nov. 2, 1909.

Application filed October 12, 1907. Serial No. 397,159.

*To all whom it may concern:*

Be it known that I, ALBERT LAWRENCE MOWRY, of the city of St. John, in the county of St. John, Province of New Brunswick, Canada, have invented certain new and useful Improvements in Machines for Manufacturing Grooved Pins or the Like, of which the following is a specification.

My invention relates to an improved machine for manufacturing grooved pins, particularly the type of pins adaptable for use in a lock nut, such as that shown in United States Patent 753421, dated March 11th, 1904, and the objects of my invention are to provide an exceedingly simple and efficient form of machine for this purpose, which will automatically manufacture the said grooved locking pin from wire which is fed continuously into the machine, all the operations thereof being automatically carried out; further objects being to provide means for automatically indicating when the feeding machine becomes interrupted, further objects still being to provide means for trimming the pins to the correct length after they have been cut and grooved.

An embodiment of my invention for obtaining these objects is illustrated herein, and as shown consists essentially of a wire feeding and strengthening mechanism, a cutting mechanism adapted to cut the wire into blanks at predetermined lengths, a magazine below the same into which the blanks drop, a reciprocating finger operating in one end of the magazine adapted to feed the blanks forwardly, a pair of tiltable fingers at the opposite end of the magazine, a rotating die adjacent to the same, a fixed die co-acting therewith to produce grooves in the pin, a trimming mechanism operating on the pins during their passage through the die, and an alarm device adapted to automatically indicate when the feeding through the magazine becomes choked, all as hereinafter more fully set forth in detail in the accompanying specification and drawings.

In the drawings.

In the drawings like characters of reference indicate corresponding parts in each figure.

Figures 1, 7, 8, 9, 10, 11:
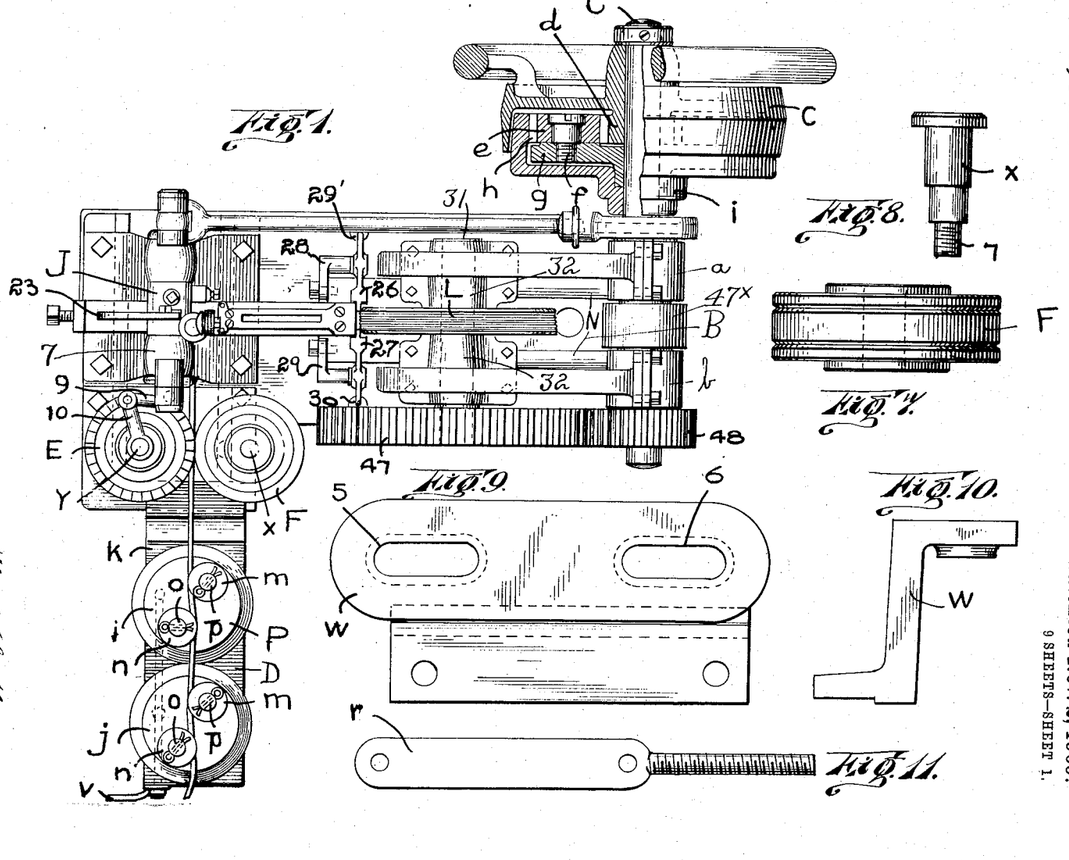
Figure 1 is a top view of my improved machine.
Fig. 7 is an elevation of one of the feeding wheels.
Fig. 8 is a detail of the pin used to secure the same to its base.
Fig. 9 is a plan view of the bracket supporting the feeding wheels.
Fig. 10 is an end view of the same.
Fig. 11 is a detail of the lever used to automatically tighten the wire straightening means.
Figure 2:
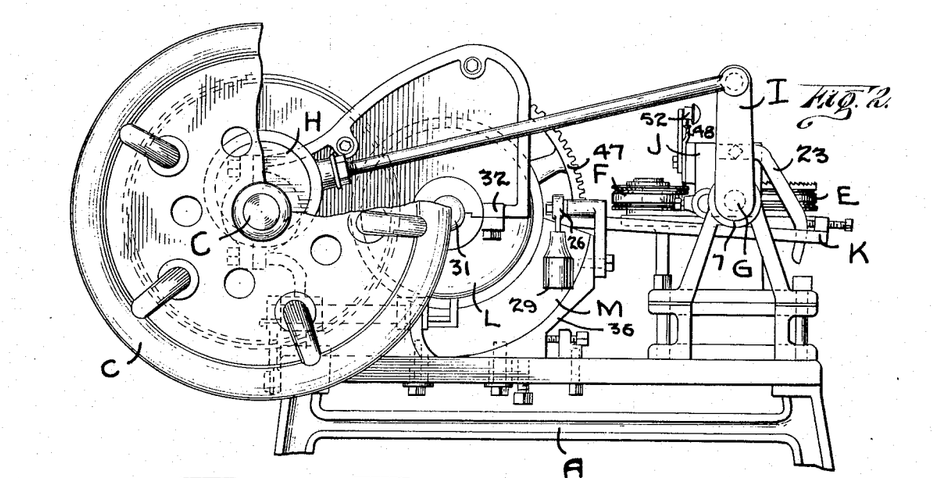
Fig. 2 is a side view of the same.
Figure 3:
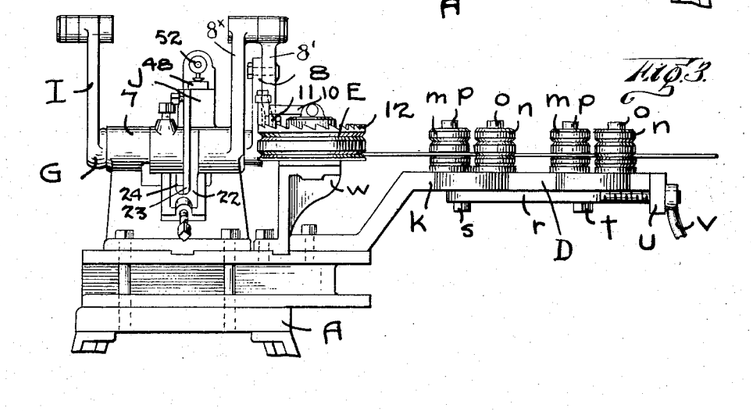
Fig. 3 is an end view of the wire feeding and cutting mechanism alone.

Referring to the drawings, particularly Figs. 1, 2 and 3, A is the frame which may be of any desirable form and has at the end thereof a bracket B supporting the bearings $a$ and $b$ of the main driving shaft C. This driving shaft is connected in any suitable manner to a source of power. In the embodiment illustrated I have shown a gear attached thereto, consisting of an main driving wheel $c$, adapted to receive a belt, fitting loosely on the shaft, having integral therewith a small driving pinion $d$, which meshes with a like pinion $e$ supported by a pin $f$ from a disk $g$ which is supported on the main shaft and keyed thereto.

The pinion $e$ meshes with an internal annular gear $h$ formed integral with a disk $i$ which is fixedly secured in position by means of a bracket 50 connected to the main frame. By this means when the main driving wheel is rotated it rotates the pinion $e$ which meshes with the internal gear $h$ and consequently rotates the disk $g$, which being keyed to the shaft C rotates the said shaft, thus increasing the leverage by the difference between the center of the driving shaft and the center of the pin $f$. Any other suitable form of gear, however, might be employed to drive this gear and I do not claim this feature as a distinctive part of my invention.

The wire to be used, in manufacturing the pins, is held on a reel close to the machine, and is first led through a straightening device D. This consists, as shown, of two disks $i$ and $j$ which are rotatably supported in cylindrical apertures in a bracket $k$, which is supported from the main frame, the disks being held by suitable means in the apertures, that shown comprising an annular flange $l$, which extends around the inside of the apertures in the bracket, and enters like grooves provided in the disks.

Each of the disks carry two rollers $m$ and $n$ supported on pins $o$ and $p_r$ which are placed diametrically opposite each other. Each of the rollers has grooves $q$ provided around its periphery, in which the wire is adapted to take. Both disks are simultaneously operated to exert a tension on the wire by means of a rod $r$, which is connected to each of the disks by pins $s$ and $t$, and has its outer end screw-threaded and extending through a downwardly projecting flange $u$ on the bracket, its extreme outer end being connected to a handle $v$ by means of which it may be rotated, causing a slight rotation of the disks and exerting a greater or less tension on the wire according to the direction of movement. The wire next passes between two feeding rollers E and F, which bear on the sides of the same. These are adjustably supported from a bracket $w$, (shown in detail in Figs. 9 and 10) by means of pins $x$ and $y$, which extend through slots 5 and 6 in the brackets, being locked therein by nuts which are secured on the reduced screw-threaded ends 7 of the pins. One of these feeding wheels is intermittingly rotated by suitable means, that I have shown consisting of a rock shaft G supported in bearings 7 on the frame A and connected to the feed wheel by a crank 8 secured to the end of the shaft G and having its other end connected to a link 8' which is pivoted to an upright $8^x$ carried by one of the bearings 7. The link 8' has its lower end connected to a link 9 which is in turn connected with the link 10, which is mounted to turn on the stud Y. A pawl 11 is attached to the connected ends of the levers 9 and 10 and this pawl engages the teeth of the ratchet wheel 12, secured to or formed integral with the feed wheel. By this means the feed wheel is intermittingly rotated, but its rotation may be stopped by lifting the pawl 11 from off the ratchet wheel.

The rock shaft G is rocked in a suitable manner from the main shaft, the means shown comprising an eccentric H on the main shaft connected to the crank I on the rock shaft.

Figures 12, 13, 14, 15, 16, 17, 18, 19, 20, 21, 22, 23, 24, 25:
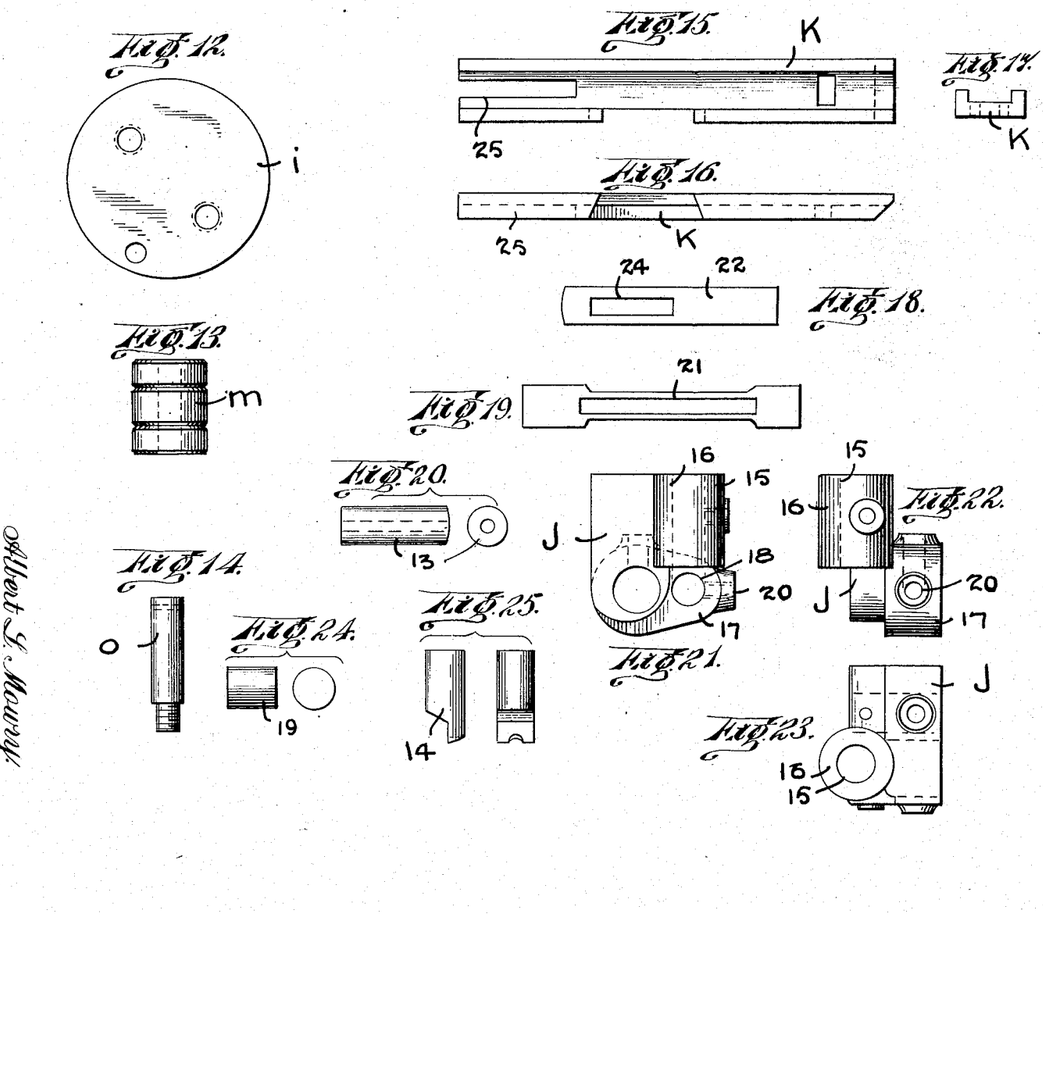
Fig. 12 is a plan view of the disk supporting the wire straightening rollers.
Fig. 13 is an elevation of one of the wire straightening rollers.
Fig. 14 is an elevation of the pin used to secure the same in position.
Fig. 15 is a top view of the magazine.
Fig. 16 is a side view of the same.
Fig. 17 is an end view of the same.
Fig. 18 is a plan view of a slide operating in the magazine.
Fig. 19 is a plan view of the cover of the magazine.
Fig. 20 is a detail side and end view of the die through which the wire is led prior to cutting.
Fig. 21 is a side view of the tiltable shear block.
Fig. 22 is an end view of the same.
Fig. 23 is a top view.
Fig. 24 is a detail side and end view of the adjustable gage held in the shear block.
Fig. 25 shows detail elevations of the cutting die for the wire.
Figures 26, 27, 28, 29, 30:
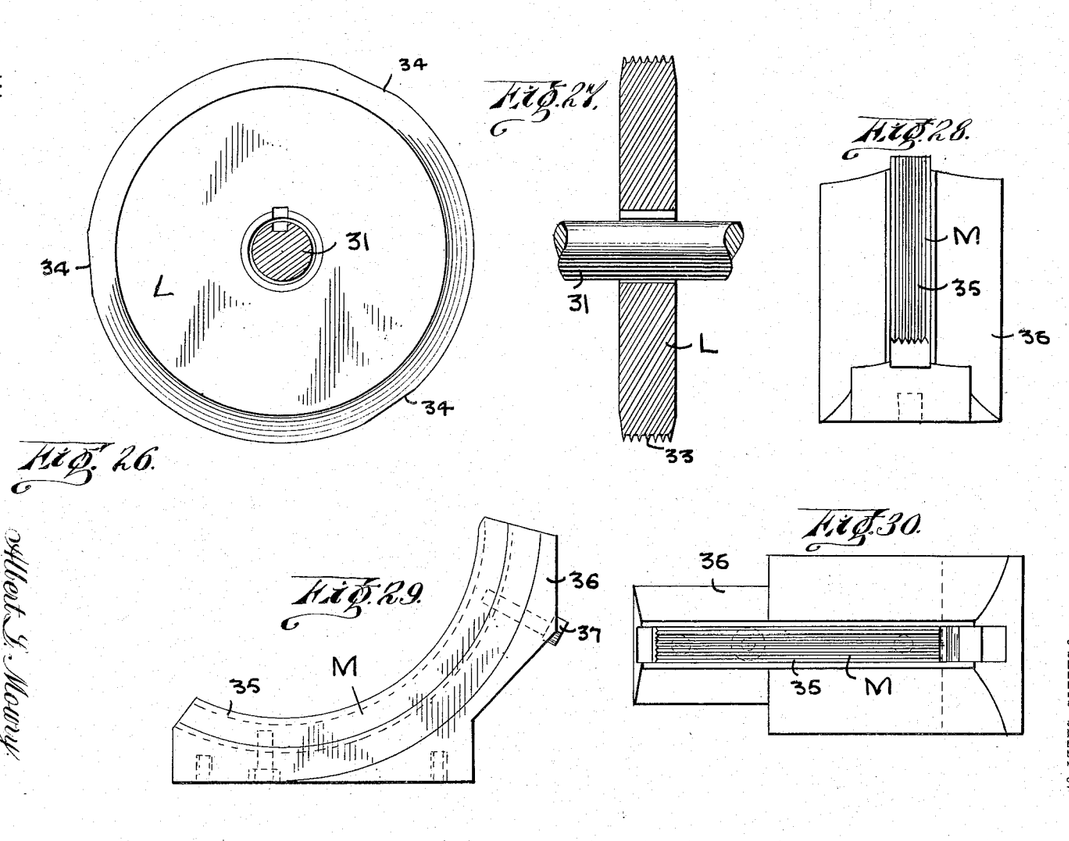
Fig. 26 is an enlarged side view of the rotating die for grooving the pins.
Fig. 27 is a transverse sectional view through the same.
Fig. 28 is a front view of the fixed die.
Fig. 29 is a side view of the same.
Fig. 30 is a top view of the same.
Figure 31:
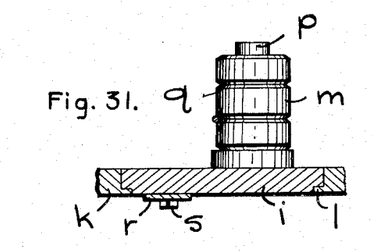
Fig. 31 is a transverse section through one of the disks carrying the wire straightening rollers.

After passage through the feeding wheels, the wire passes through a die block 13 supported from the bearing 7, and is then operated on by the shear 14 (shown in Fig. 25) which is carried by the rocking shear block J (shown in detail in Figs. 21, 22, and 23). This shear block is supported on the rock shaft G, and is of the form shown, having a cylindrical portion 15 with a recess 16 therein, for the reception of the shear 14, and a lower portion 17, having a horizontal recess 18 therein, in which the gage block 19 is adjustably held by a set-screw extending through the hole 20 in the side of the gage block. The wire is adapted to fit against this shear block prior to the operation of the shear and thus have the length of the blank gaged. Immediately below the shear block is the magazine K having a portion of the top open and into which the blanks drop as they are cut from the wire. This magazine extends substantially horizontal and is provided at its forward part with a cover 21 which is preferably kept in place by an elastic band whereby if the feeding becomes choked, it may be forced upwardly to operate the alarm device as hereinafter indicated.

At the rear end of the magazine a slide 22 reciprocates therein, whereby the blanks are fed through the magazine. The means shown to accomplish this reciprocation comprise an oscillating finger 23 secured to a rocking shear block J and which extends through a slot 24 in the slide and a slot 25 in the magazine. By this means blanks are continuously forced through the magazine and coming to the end thereof they drop for a moment onto two fingers 26 and 27 pivoted to brackets 28 and 29 secured to die block 36 which is secured to the main frame and which are gravity held in position with freedom to tilt downwardly by weights 29' and 30 secured to their opposite ends.

L is the rotating die which is in the form of a disk supported by a shaft 31 extending through bearings 32, secured to the main frame. The periphery of the disk is adapted to almost touch the fingers and is provided with continuous grooves 33, to suit the number of grooves that are to be cut on the pins. In addition to this there are a plurality of transverse recesses 34 provided around the periphery, by means of which the introduction of the pin between the rotating and fixed dies is accomplished. The rotation of the shaft 31 is accomplished by means of a gear 47 connected thereto, and which meshes with a pinion 48 secured to the main shaft.

Figure 4:
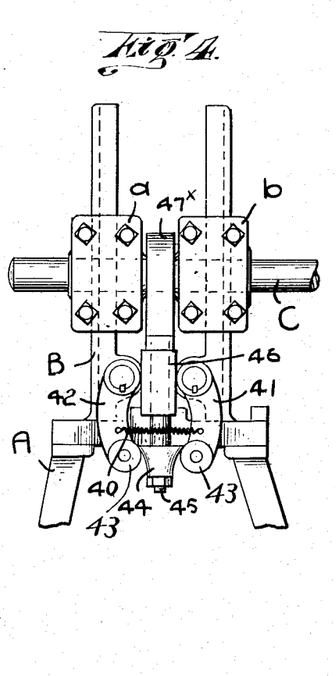
Fig. 4 is a rear end view of the trimming mechanism alone.
Figure 5:
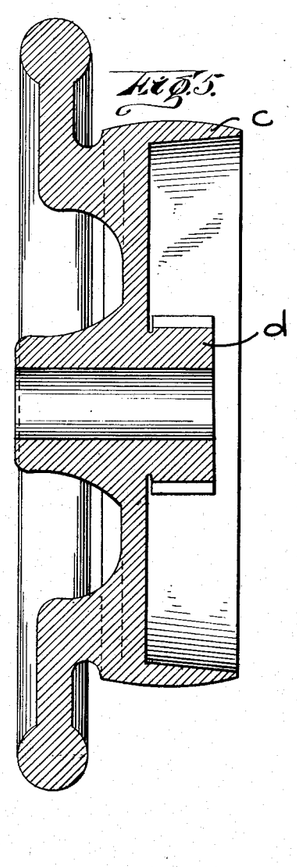
Fig. 5 is an enlarged sectional detail of the outer driving gear.
Figure 6:
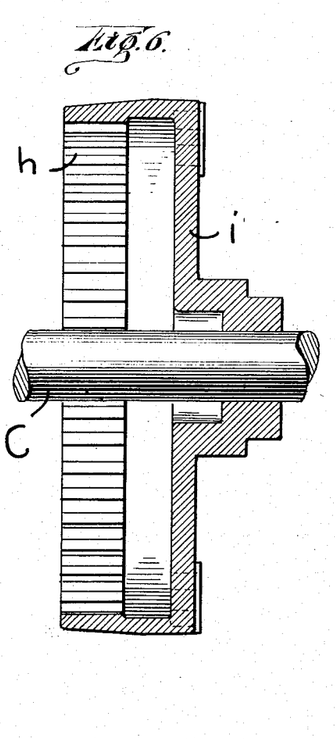
Fig. 6 is an enlarged sectional detail of the inner driving gear.

M is the fixed die, which is arc-shaped as shown and provided with grooves 35 to correspond with the grooves on the rotating die. The fixed die is supported in a bracket 36 secured to the main frame and being held therein by suitable bolts 37. As the die L revolves, one of the recesses 34 will come opposite the end of the magazine and the feeding apparatus in the magazine is so adjusted that at this instant, it will discharge one of the blanks into the recess. This blank will be caught and held on the ends of the fingers 26 and 27, and be held there until it is struck by the edge of the recess when it will be drawn in between the dies, rolled between them and be discharged at the bottom of the die M completely grooved as desired. The fingers 26 and 27 prevent the blank from falling to the bottom of the recess as if it did not do this, the recess, being slightly wider than the diameter of the blank, the blank would slide against the fixed die and would jam the machine. During passage through these dies the ends of the pins are trimmed by cutters 38 which are located on opposite sides of the dies and are operated by means of oscillating cutter shafts N. These cutter shafts are supported in suitable bearings 39, secured to the main frame and are oscillated by suitable means, the means I have shown being illustrated in Fig. 4 and comprising crank arms 41 and 42, secured to the cutter shafts and having rollers 43 at their opposite ends which bear on a vertical reciprocating conical cam block 44. This cam block is secured on a vertically extending rod 45, which extends through a bearing 46, and has the upper end abutting a cam 47* secured to the main shaft C. The rod is held in contact with the cam by the action of a tension spring 40 connected to the two crank arms 41 and 42 normally bringing them together, and exerting an upward force on the rod 45, through the conical cam 44. The adjustment of the cams is such that the cutters will be actuated to cut at the exact moment when one of the pins is passing. The pins on passing through the dies will be completed and may be received there by a suitable receptacle.

Figure 32:
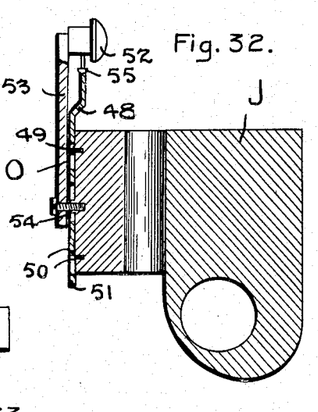
Fig. 32 is an enlarged sectional detail showing the alarm mechanism for indicating the bracket in the feeding through the magazine.
Figures 33, 34:
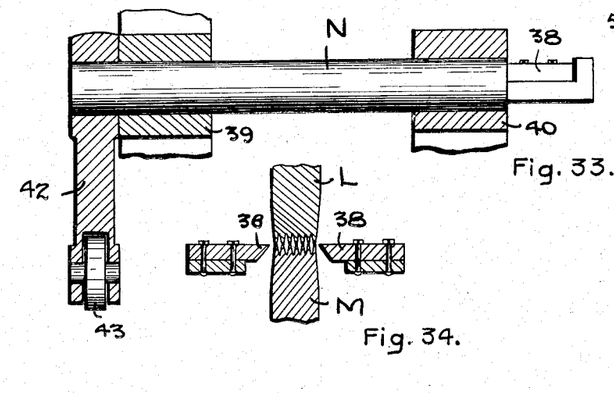
Fig. 33 is an enlarged sectional detail of the cutter shaft for trimming the pins as they pass through the die.
Fig. 34 is a sectional detail of the cutter carried by the same.
Figure 35:
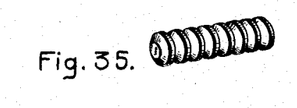
Fig. 35 is a perspective view of one of the locking pins.
Figure 36:
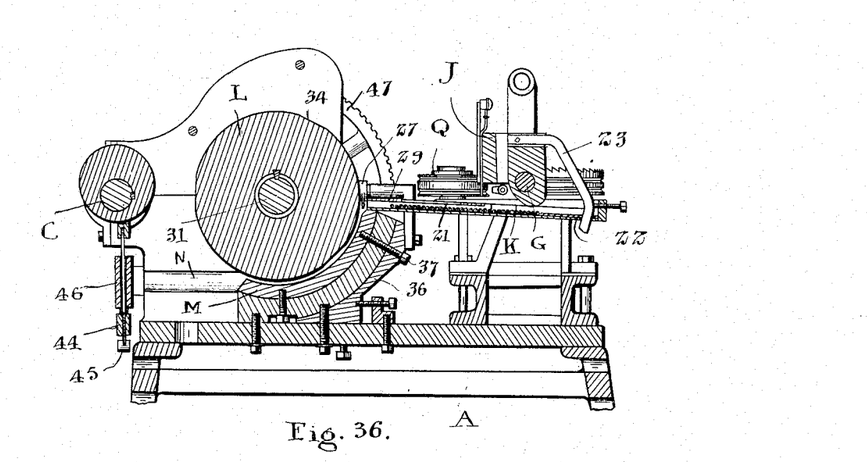
Fig. 36 is a longitudinal sectional view through the assembled machine.
Figure 37:
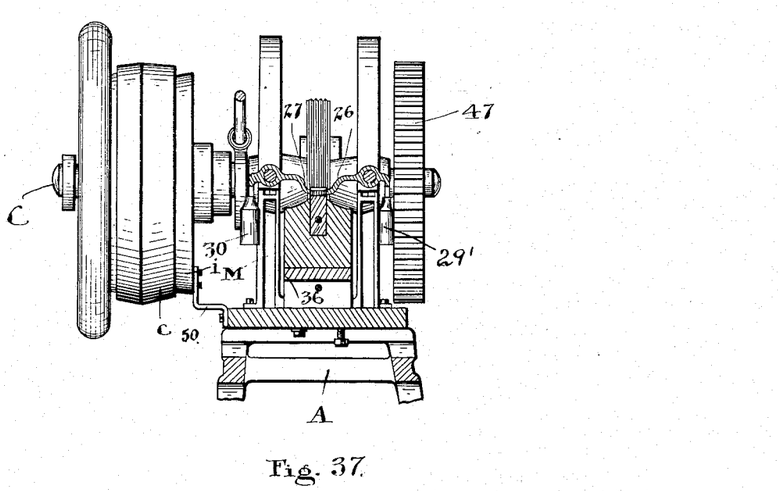
Fig. 37 is a transverse section through the tiltable fingers.
Figures 38, 39, 42:
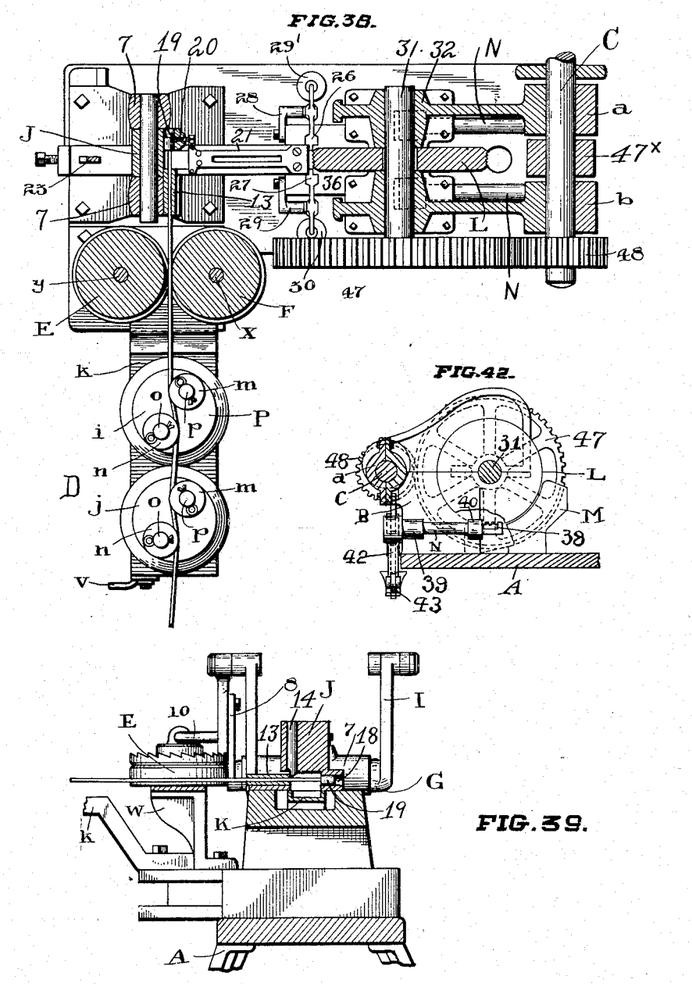
Fig. 38 is a horizontal section through the assembled machine.
Fig. 39 is a transverse section showing the coacting cutter and die.
Fig. 42 is a vertical sectional detail taken to one side of the disk L.
Figure 40:
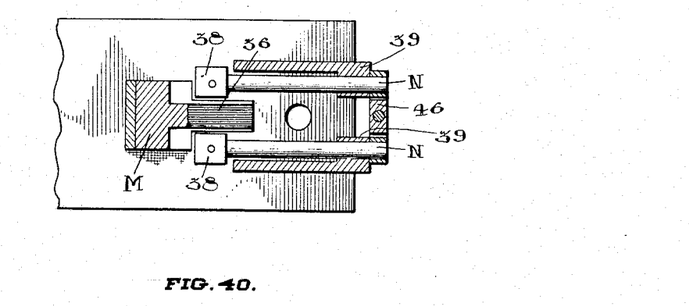
Fig. 40 is a horizontal sectional detail along the axis of the shafts N.
Figure 41:
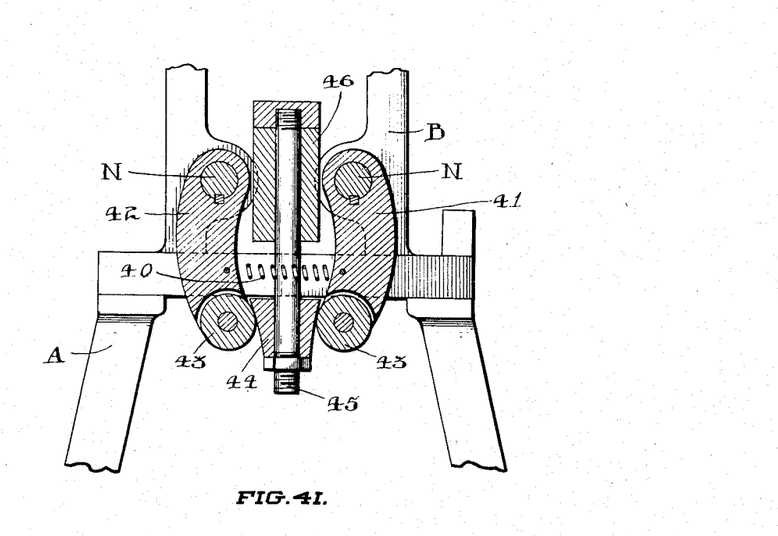
Fig. 41 is a vertical sectional detail taken through the cranks 41 and 42.
Figure 43:
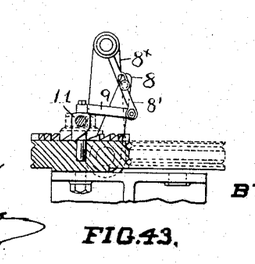
Fig. 43 is a transverse vertical sectional view of the feed means.

To give warning of any interruption in the feeding I provide the alarm device O, shown in detail in Fig. 32. This consists of a rod 48 which is slidably supported in the face of the shear block j by means of pins 49, entering slots 50 in the rod. The end 51 of the rod is adapted to extend slightly below the edge of the shear block and in its lowest position, is adapted to just touch the top of the magazine when in its lowest position, as will be seen from the sectional view in Fig. 36.

Should there be any stoppage in the feeding, the top of the magazine would be moved upwardly, which would cause an upward movement of the sliding rod 48. To indicate this to the operator of the machine, a push bell 52 is supported on a rod 53 of a lug 54, on the shear block, the button 55 of the bell normally touching the top of the sliding rod 48.

In the operation of the machine the wire is fed from a reel between the straightening and tensioning device D to the feeding wheels E and F, which feed the wire through the die 13 against the gage block 19, when it is cut off, in suitable lengths by the shear 14 carried by the rocking shear block J. The blank then drops into the magazine K through which it is fed by the action of the reciprocating slide 22, operated by the oscillating finger 23. The blank is then discharged at the moment when the recess 34 comes opposite the end of the magazine. It rests for a moment on the fingers 26 and 27, until engaged by the edge of the recess and rolled between the dies as hereinbefore explained. During passage through the dies it is operated on by the cutters 38 which trim the ends thereof. Finally it drops from between the dies complete in every respect. Should any failure occur in the feeding operation the same is at once indicated by the alarm device O.

It will thus be seen that I have devised a machine which is entirely automatic in its operation. The wire may be placed on a large reel near by and the operation of the machine started. It needs no further attention and should any failure occur in the feeding the push bell 52 is at once operated to indicate to an attendant, who may be occupied at other work near by, that the machine should be stopped until the jamming of the pins in the magazine has been remedied.

While the machine has been described particularly with reference to the manufacturing of the locking pins for lock nuts, yet it will be readily understood that the important features thereof might with facility be applied to the manufacture of any similar form of article such as wood screw. It will therefore be readily understood that while I have described with great particularity the details of my device, yet in carrying out the construction of the same, changes may be made therein without departing from the spirit of the invention.

What I claim as my invention is:—

1. A machine for manufacturing grooved pins having a fixed die and a cylindrical rotating die provided with a transverse depression in combination with the magazine discharging between the dies, having means in the magazine adapted to discharge a blank whenever the transverse depression comes opposite the end of the magazine, tiltable depressible fingers immediately adjacent to the rotating die, adapted to receive the pin discharged from the magazine, and prevent it dropping between the dies until it is engaged by the edge of the transverse depression, the said fingers being adapted, when the pin is engaged by the edge of the recess, to yield and permit the pin to be rolled between the dies.

2. In a machine for shaping articles by rolling action, the combination of a fixed die and a die in coöperative relation therewith movable relatively thereto, cutters located at opposite sides of the path of the work piece mounted so as to permit of movement toward and from the dies and adapted to trim the ends of a piece as it passes between the dies, said cutters having cutting edges which lie substantially parallel with the said path, and means between the cutters and under the control of the movable die adapted to move the cutters simultaneously in relation to the dies at predetermined intervals.

3. A machine for the purpose specified, the combination with a fixed and rotating die, and a magazine, of means for feeding blanks through the magazine, and between tiltable fingers located between the delivery end of the magazine and the dies, the tiltable fingers arranged in such relationship to the dies, that the blanks are adapted to rest thereon by gravity, prior to and until they are drawn between the two dies.

4. In a machine for the purpose specified, the combination with a fixed and a rotating die, a feeding magazine, and means for feeding the blanks therethrough, of centrally pivoted fingers having their inner ends adapted to receive the blanks from the magazine as they are forced out by the feeding means, said blanks being adapted to rest by gravity thereon until they are drawn between the dies, and weights connected to said fingers adapted to maintain them in normal position.

5. In a machine for the purpose specified, the combination with a magazine comprising a reciprocating pusher member, said magazine having a movable top adapted to be raised by clogging of the blanks therein, means for feeding the blanks through the magazine, a rock shaft, means between the rock shaft and reciprocating member adapted to operate the latter when the rock shaft is oscillated, means for oscillating the same, an audible signaling device having an operating lever adapted to be engaged by the top of the magazine when raised from its normal position, the movement of the operating lever being adapted to actuate the signaling device.

6. In a machine for the purpose specified, the combination with coöperating dies, means for moving at least one of the dies, oscillating trimming cutters mounted upon the shaft and adapted to operate upon one end of the work as it passes between the dies, means for supporting the shaft, a crank arm on the shaft having the free end adapted to engage a cam, the movement of the said cam being controlled by a mechanism which is connected to the die-moving mechanism.

In witness whereof I have hereunto set my hand in the presence of two witnesses.

ALBERT LAWRENCE MOWRY.

Witnesses:
HARRISON A. McKEOWN,
C. MURRAY OLIVE.